July 15, 1947.
N. E. PEERY
2,423,850
PROCESS FOR EFFECTING CATALYTIC CONVERSIONS
WITH FINELY DIVIDED CATALYSTS
Filed May 14, 1945
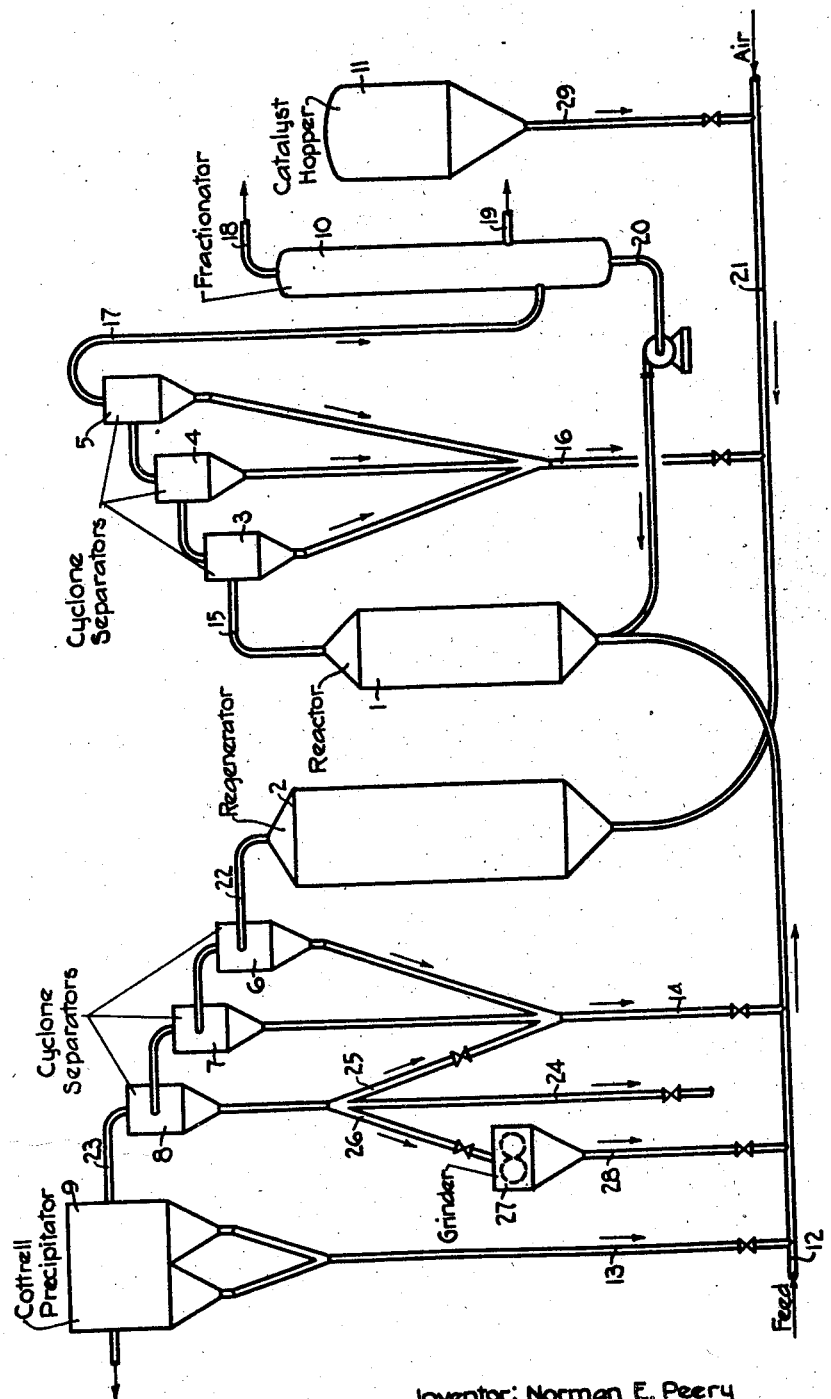
Inventor: Norman E. Peery
By his Attorney:

Patented July 15, 1947

2,423,850

UNITED STATES PATENT OFFICE 2,423,850

PROCESS FOR EFFECTING CATALYTIC CONVERSIONS WITH FINELY DIVIDED CATALYSTS

Norman E. Peery, San Francisco, Calif., assignor to Shell Development Company, San Francisco, Calif., a corporation of Delaware Application May 14, 1945, Serial No. 593,626

9 Claims. (Cl. 23—1)

This invention relates to an improvement in the application of finely divided or powdered catalysts. More particularly the invention relates to an improved method for effecting catalytic conversions with finely divided catalysts which is restricted to application in catalytic systems having the following characteristics: (1) The catalyst is used in the form of a finely divided solid consisting of particles of various sizes. (2) The catalyst is used under conditions whereby appreciable degradation of the catalyst particles takes place by attrition and/or erosion. (3) The activity or effectiveness of the catalyst is maintained at a desired level by continuously or intermittently replacing a portion of the catalyst by fresh or more active catalyst. (4) The catalyst at some step in the process is contacted with a stream of a gas or vapor which leaves the system and which tends to carry in suspension with it a portion of the catalyst. (5) The catalyst carried in suspension in the gas or vapor is separated in a plurality of stages in series, each succeeding stage separating a fraction of the suspended catalyst having a smaller average particle size.

In view of several disadvantages inherent in fixed bed catalyst systems, various processes have been proposed for effecting catalytic conversions while cycling the catalyst in a finely divided or powdered form through the reaction zone and, if desired, a separate regeneration zone. In processes of this type an appreciable amount of grinding or degradation of the catalyst particles takes place due to erosion and attrition. Consequently the particles of the equilibrium catalyst range in size from the smallest size capable of being recovered and retained in the system by the recovery equipment up to the largest particles in the fresh catalyst added. The amount of catalyst of any given size within this range depends upon the size range of the fresh catalyst added and the efficiency of the various pieces of recovery equipment under the conditions of use.

If such systems where the finely divided catalyst is contacted with a gas or vapor stream which may be a reactant or simply a medium of transport, a portion of the finely divided catalyst tends to be carried out of the system in suspension. In order to avoid excessive losses of the catalyst, the suspended catalyst is separated from the gas stream and returned to the main body of the catalyst. The separation may be accomplished by means of cyclone separators, electrical precipitators, bag filters, scrubbers, or the like, or by a combination of two or more such means. In general, however, cyclone separators are used because of their efficiency and low cost. In most cases two or more cyclone separators are used in series. Also, in most cases the main portion of the suspended material is separated by centrifugal action (cyclone type separators) and then the very fine material which escapes such separation is separated by means of an electrical precipitator (Cottrell precipitator). In the application of two or more separators in series, the suspended particles are separated as fractions having progressively decreasing particle sizes, the last separator collecting the finest material.

One of the primary advantages of processes of the described type is that they may be carried out substantially continuously. In such operation the catalyst gradually loses its activity or effectiveness. In order to maintain the effectiveness of the catalyst at a desired level it is desirable to continuously or intermittently replace a portion of the catalyst with fresh catalyst. The activity level of the catalyst after equilibrium has been established is therefore a function of the replacement rate. The primary object of the process of the present invention is to provide a process whereby a higher equilibrium activity of the catalyst may be maintained at any given catalyst replacement rate.

In the usual design and operation of such systems a portion of the very fine particles produced by attrition are lost through the last separation stage. However, the amount so lost is not sufficient to provide for the required catalyst replacement. In the usual operation therefore, additional catalyst is removed either by decreasing the efficiency of the last stage, thereby increasing the loss, or by removing a portion of the equilibrium catalyst. According to one embodiment of the present invention, the efficiency of the separation stages is retained, thus maintaining normal small losses of such fine material and the material removed to provide for the desired catalyst replacement is taken from the next to the last stage of separation. According to a second embodiment of the invention this material removed from the next to the last stage of separation is passed through a grinder and returned to the system and the required catalyst removal is effected by loss through the last separation stage.

The process of the invention is applicable and advantageous in various catalytic conversions when carried out in systems of the type described. Thus, it may be applied in such systems regardless of the particular conversion or treatment being carried out. The gas or vapor stream may be a reactant vapor, or a gas or vapor used for another purpose such, for example, as to transport the catalyst or to flush or strip the catalyst of some adsorbed material, or simply as an inert diluent. Also, the catalyst may be a single material or a mixture of two or more distinct materials and may be of any composition. However, an immediate contemplated application of the invention is in the catalytic cracking of hydrocarbon vapors by the fluid catalyst catalytic cracking process. The particulars of the invention therefore will be described in connection with this process.

To assist in the description, reference is had to the accompanying drawing wherein there is illustrated by means of conventional figures, not drawn to scale, the more important elements of a fluid catalyst catalytic cracking plant adapted for operation in accordance with the process of the invention. A fluid catalyst catalytic cracking plant of the upflow type has been chosen to illustrate the invention primarily because this system is somewhat simpler to illustrate and understand than the newer downflow type systems (see Oil and Gas Journal, 43, 64 (1945) for further particulars regarding these systems). However, it will be understood that the invention is just as applicable and advantageous in this latter type of system as well as in various other systems. Referring to the drawing, the plant comprises a fluid catalyst reactor 1, a fluid catalyst regenerator 2, a series of three cyclone separators 3, 4 and 5, a second series of three cyclone separators 6, 7 and 8, a Cottrell precipitator 9, a fractionator 10, and a catalyst hopper 11. Three cyclone separators are shown in series as this is the usual number. However, it will be appreciated as a greater or lesser number of cyclone separators can be used.

The catalyst used in the system may be any one of the various solid cracking catalysts known in the art and may be, for example, a Filtrol catalyst or a synthetic silica-alumina composite catalyst. The catalyst charged to the unit is ordinarily ground to pass a 100 mesh sieve. A typical size analysis of a synthetic silica-alumina composite catalyst as charged to a commercial unit is as follows:

| Size in Microns | Per cent Finer Than Size Indicated |
| --- | --- |
| 25 | |
| 50 | 28 |
| 75 | 58 |
| 100 | 78 |
| 125 | 90 |
| | 98 |

However, it will be appreciated that catalysts having particles up to about 200 or 300 microns or even larger may be and have been used. During use the various particles are subjected to attrition and erosion and there is consequently a displacement towards the smaller sizes.

The oil to be cracked may be any normally liquid hydrocarbon oil such, for example, as a gas oil fraction. The oil feed (usually preheated up to a temperature of, for example, 400–750° F. by means not shown) enters the system via line 12. Catalyst which has been collected by the Cottrell precipitator 9 is introduced into this oil stream via standpipe 13. There is then introduced into the oil stream a suitable quantity of hot freshly regenerated catalyst from standpipe 14. The amount of catalyst introduced into the oil in this type of cracking unit is usually between about 2 and 10 parts by weight. However, in other types of systems much larger amounts are often used. The mixture of catalyst and oil then passes into the reactor 1 which is of such dimensions that the catalyst tends to settle out in a fluidized bed. The conditions in reactor 1 are maintained suitable for the desired conversion of the particular oil and are in general about as follows:

Pressure _____atmospheres__ 0–3
Temperature _____°F__ 800–1050
Liquid hourly space velocity_____ 0.5–3.0

The hydrocarbon vapors passing overhead out of reactor 1 carry in suspension an amount of catalyst equal to that introduced via line 12. This mixture passes via line 15 through the series of three cyclone separators 3, 4 and 5. In the cyclone separators the main portion of the suspended catalyst is separated, the first cyclone separator collecting the main portion of the suspended catalyst, the second cyclone separator collecting an intermediate fraction, and the last cyclone separator collecting relatively fine material. The three cyclone separators are used merely to effect an efficient separation of the catalyst from the vapors, the separated fractions of catalyst being immediately recombined in a common standpipe 16. The hydrocarbon vapors from the last cyclone separator contain only a small amount of very fine catalyst particles. These vapors pass via line 17 to fractionator 10 wherein the product is separated into the desired fractions. Thus, gasoline plus gas may be removed overhead via line 18 and gas oil may be removed via line 19. A small amount of heavy oil containing the small amount of catalyst fines which escaped separation in the cyclone separators collects at the bottom of fractionator 10 and is withdrawn via line 20 and recycled to the reactor. Thus, no catalyst is lost from the reaction side of the system.

The partially spent catalyst collected in the cyclone separators 3, 4 and 5 is picked up from standpipe 16 by a stream of air in line 21 and carried to a conventional upflow fluid catalyst regenerator 2. The spent regeneration gas carries the regenerated catalyst in suspension out of the top of the regenerator via line 22. The regenerated catalyst is separated from the flue gas in the series of three cyclone separators 6, 7 and 8. The main portion of the suspended catalyst is separated by the first cyclone separator 6. Cyclone separator 7 collects a second fraction of the catalyst which is somewhat finer than that collected in cyclone separator 6. Cyclone separator 8 separates a still further fraction of catalyst of still somewhat smaller average particle size. The flue gas leaving separator 8 via line 23 carries with it a small amount of catalyst particles which are too small to be efficiently removed by cyclone separator 8. This gas is passed through Cottrell precipitator 9 wherein nearly all of the fine material is separated. Cottrell precipitators, it will be appreciated, are relatively non-selective as to particle size and in this respect differ fundamentally from cyclone type separators. Thus, whereas a typical efficiency curve of a cyclone separator for a given set of conditions is as follows:

| Particle size in microns | Per cent of efficiency of separation |
|---|---|
| 20 | 52 |
| 25 | 72 |
| 30 | 85 |
| 35 | 95 |
| 40 | 98 |
| 45 | 99 | the Cottrell precipitators are substantially equally effective in recovering particles of various sizes. Thus, for example, a typical analysis of the material collected in the Cottrell precipitator in a fluid catalyst catalytic cracking plant is as follows:

| Particle size range, microns | Per cent by weight |
|---|---|
| 0-20 | 88 |
| 20-40 | 11.1 |
| 40-60 | 0.6 |
| 60-80 | 0.4 |

This fraction collected by the Cottrell precipitator is returned to the reactor as described, or it may be returned by separate means (not shown) to the regenerator and thence to the reactor. The fractions collected by the cyclone separators 6 and 7 are likewise returned to the reactor via standpipe 14 as described. The fraction collected in separator 8 may be returned along with the fractions separated by cyclone separators 6 and 7 via standpipe 24 and branch standpipe 25 to standpipe 14. As soon as the system starts to operate, however, the activity or effectiveness of the catalyst begins to decline. When the activity has declined to the normal level it becomes desirable to replace part of the catalyst with fresh catalyst from hopper 11. The amount of fresh catalyst to be added depends upon the particular catalyst, the particular reaction conditions, the particular material being treated, and the activity level desired. In a plant of nominal 15,000 barrels per day capacity, for example, typical replacement rates are in the order of 3-5 tons per day or between about 0.5 and 3% of the catalyst inventory. As soon as replenishment of the catalyst becomes desirable, the desired amount of fresh catalyst is introduced into the regenerator from hopper 11 via standpipe 29 and line 21. In order to maintain the catalyst inventory substantially constant, a suitable amount of catalyst is withdrawn from the system via standpipe 24. This material, it will be noted, is that fraction of separated catalyst which is recovered by the next to the last separator and consists predominantly of particles which are smaller than the average, but somewhat larger than the average particles normally collected in the last separator, (in this case the Cottrell precipitator). It will be appreciated that the amount of material removed via standpipe 24 will normally be less than the amount of fresh catalyst added for replacement due to the small loss of fines through the Cottrell precipitator. For example, if the loss of catalyst through the Cottrell precipitator is 1 ton per day and the desired replacement rate is 4 tons per day, the amount of material withdrawn via standpipe 24 is 3 tons per day. The amount of material withdrawn via standpipe 24 is usually greater than the amount of material lost through the Cottrell precipitator, but it may be less. Any excess material collected by cyclone separator 8 beyond that withdrawn may be recycled to the reactor via branch standpipe 25. However, according to a preferred embodiment of the invention, the material collected in the next to the last separator (in this case separator 8), is first passed through a mill and ground before it is recycled. Thus, instead of passing the excess material via branch standpipe 25 it is passed via branch standpipe 26 to a grinder 27 and then via standpipe 28 to line 12. Grinder 27 may be of any conventional type, for example, a Raymond mill or a ball mill. It is not necessary that the material should be ground exceedingly fine, a more or less superficial grinding being sufficient to accomplish the purpose. While it is not desired to be bound by the correctness of any theories, it is believed that the effectiveness of the grinding operation is to be attributed to its effect in evening up or straightening out the grinding or attrition rate of the catalyst during its life in the system. Thus, the larger particles of catalyst introduced as the fresh catalyst are retained in the system until such time that they are eroded or broken down to particles which are either collected in separator 8 and removed as described, or escape through the Cottrell precipitator. However, the attrition rate of such particles is fast at first and then rapidly falls off as the particles become smaller. By subjecting such fairly fine material to a mechanical grinding treatment, the rate of degradation of the catalyst particles throughout their active life is made more uniform. Consequently the proportion of smaller particles derived from larger particles and hence of greater age, is decreased. This results in a higher activity of the equilibrium catalyst. It will be noted that this only applies when the catalyst is continuously or intermittently replenished by fresh catalyst to maintain an equilibrium activity.

In some cases the catalyst replacement rate may be such that it is unnecessary to withdraw any additional catalyst beyond that lost through the last separation stage. This is particularly the case where the efficiency of the last separation stage is poor due to excessive gas velocities or other causes. In such cases a portion, or preferably the whole, of the fraction separated by the next to the last separation stage is subjected to the described grinding treatment and recycled to the reaction system. This latter system is particularly efficient when the last separation stage in the series is effected by an electrical precipitator. On the other hand, the modification described above wherein the material removed for replacement is removed directly from the next to the last separation stage is particularly advantageous when the last separation stage is a scrubber wherein the fine catalyst is scrubbed from the exit gas by means of a portion of the oil feed.

In some other cases the amount of catalyst collected in the next to the last separation stage may be insufficient to provide for the desired replacement rate. In such cases the deficiency may be made up by withdrawing a portion of the catalyst preferably from the next preceding separation stage.

I claim as my invention:

1. In a catalytic conversion system in which a finely divided solid catalyst consisting of particles of different sizes is recycled under conditions causing attrition, and in which catalyst is separated from a stream of a vapor or gas in a series of separators, and in which a small portion of the catalyst is replaced by more active catalyst to maintain a substantially uniform equilibrium activity, the improvement which comprises subjecting the fraction of catalyst of intermediate size range separated and collected by the next to the last separator to a mechanical grinding treatment and then recombining it with the main portion of the catalyst.

2. In a catalytic conversion system in which a finely divided solid catalyst consisting of particles of different sizes is recycled under conditions causing attrition, and in which catalyst is separated from a stream of a vapor or gas in a series of separation stages, and in which a small portion of the catalyst is replaced by more active catalyst to maintain a substantially uniform equilibrium activity, the improvement which comprises separating from the main charge of catalyst a fraction of the catalyst consisting predominantly of particles of an intermediate size range which is above that of the material normally collected in the last separation stage, subjecting said fraction of catalyst of intermediate size range to a mechanical grinding treatment and then recombining it with the main portion of the catalyst.

3. In a catalytic conversion system in which a finely divided solid catalyst consisting of particles of different sizes is recycled under conditions causing attrition, and in which a small portion of the catalyst is replaced by more active catalyst to maintain a substantially uniform equilibrium activity, and in which catalyst is separated from a stream of vapor or gas in a series of separators the first of which is a centrifugal separator and the last of which is an electrical precipitator, the improvement which comprises subjecting the fraction of catalyst of intermediate size range separated and collected by the separator just preceding the electrical precipitator to a mechanical grinding treatment and then recombining it with the main portion of the catalyst.

4. In a fluid catalyst system in which a continually renewed finely divided catalyst is contacted with a gas or vapor stream which tends to carry in suspension a portion of said finely divided catalyst from the system, the improvement which comprises separating the suspended catalyst from said gas or vapor stream in a stepwise fractional manner by means of a series of at least two cyclone separators followed by an electrical precipitator, subjecting the fraction of catalyst separated and collected by the last cyclone separator to a mechanical grinding treatment and then recombining it with the main portion of the catalyst.

5. In the operation of a fluidized system wherein a continually replenished solid catalyst in the form of particles ranging essentially from a fraction of a micron diameter up to about 200 microns diameter is cycled through a reaction or treating zone by means of a stream of gas or vapor which normally carries with it in suspension a portion of the catalyst particles, the improvement which comprises continuously separating suspended particles from said gas or vapor stream in a stepwise fractional manner thereby to separate portions of the catalyst particles into fractions having progressively smaller average particle sizes, subjecting the fraction of catalyst of intermediate size range separated and collected in the next to the last separation step to a mechanical grinding treatment and then recombining it with the main portion of the catalyst.

6. In a catalytic conversion system in which a finely divided solid catalyst consisting of particles of different sizes is recycled under conditions causing attrition, and in which catalyst is separated from a stream of a vapor or gas in a series of separators, and in which a small portion of the catalyst is replaced by more active catalyst to maintain a substantially uniform equilibrium activity, the improvement which comprises removing from said system a portion of the catalyst of intermediate size range separated by the next to the last separator to provide for said replacement, subjecting the remainder of the catalyst separated by the next to the last separator to a mechanical grinding treatment and then recombining this latter portion of the catalyst with the main portion of the catalyst.

7. In the operation of a fluidized system wherein a continually replenished solid catalyst in the form of particles ranging essentially from a fraction of a micron diameter up to about 200 microns diameter is cycled through a reaction or treating zone by means of a stream of gas or vapor which normally carries with it in suspension a portion of the catalyst particles, the improvement which comprises continuously separating suspended particles from said gas or vapor stream in a stepwise fractional manner thereby to separate portions of the catalyst particles into fractions having progressively smaller average particle sizes, withdrawing from the system a portion of the catalyst of intermediate size range separated in the next to the last separation step, subjecting the remaining portion of the catalyst separated in the next to the last separation step to a mechanical grinding treatment and then recombining this latter portion of catalyst with the main portion of the catalyst.

8. In the fluid catalyst system in which a continually renewed finely divided catalyst is contacted with a gas or vapor stream which tends to carry in suspension a portion of said finely divided catalyst from the system, the improvement which comprises separating a portion of the main catalyst mass into at least three fractions consisting of coarse catalyst particles, intermediate size catalyst particles, and fine catalyst particles respectively, subjecting the fraction of intermediate size catalyst particles to a grinding treatment and recombining the three fractions with the main catalyst mass.

9. In the operation of a fluidized system wherein a continually replenished solid catalyst in the form of particles ranging essentially from a fraction of a micron in diameter up to about 200 microns diameter is cycled through a reaction or treating zone by means of a stream of gas or vapor which normally carries with it in suspension a portion of the catalyst particles, the improvement which comprises separating a portion of the main catalyst mass into three fractions consisting of coarse catalyst particles, intermediate size catalyst particles, and fine catalyst particles respectively, withdrawing a portion of said fraction of intermediate size catalyst particles, subjecting a second portion of said fraction of intermediate size catalyst particles to a grinding treatment and recombining the ground material along with said fractions of coarse and fine catalyst particles with the main catalyst mass.

NORMAN E. PEERY.

REFERENCES CITED

The following references are of record in the file of this patent:

UNITED STATES PATENTS

| Number | Name | Date |
|---|---|---|
| 2,349,574 | Conn | May 23, 1944 |
| 2,356,717 | Williams | Aug. 22, 1944 |
| 2,379,408 | Arveson | July 3, 1945 |
| 2,382,755 | Tyson | Aug. 14, 1945 |
| 2,325,611 | Keranen | Aug. 3, 1943 |
| 2,327,175 | Conn | Aug. 17, 1943 |
| 2,350,508 | Hemminger | June 6, 1944 |
| 2,379,448 | Linn | July 3, 1945 |
| 2,355,016 | Stein | Aug. 1, 1944 |
| 2,362,270 | Hemminger | Nov. 7, 1944 |

FOREIGN PATENTS

| Number | Country | Date |
|---|---|---|
| 115,689 | Australia | Aug. 6, 1942 |